United States Patent
Long (10) Patent No.: US 9,954,886 B2
(45) Date of Patent: Apr. 24, 2018

(54) METHOD AND APPARATUS FOR DETECTING WEBSITE SECURITY

(71) Applicant: BEIJING QIHOO TECHNOLOGY COMPANY LIMITED, Beijing (CN)

(72) Inventor: Zhuan Long, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 0 days.

(21) Appl. No.: 15/303,216

(22) PCT Filed: Dec. 31, 2014

(86) PCT No.: PCT/CN2014/095944
§ 371 (c)(1),
(2) Date: Oct. 10, 2016

(87) PCT Pub. No.: WO2015/154539
PCT Pub. Date: Oct. 15, 2015

(65) Prior Publication Data
US 2017/0034203 A1    Feb. 2, 2017

(30) Foreign Application Priority Data
Apr. 11, 2014    (CN) .......................... 2014 1 0144318

(51) Int. Cl.
*G06F 11/00*    (2006.01)
*H04L 29/06*    (2006.01)

(52) U.S. Cl.
CPC ................. *H04L 63/1433* (2013.01)

(58) Field of Classification Search
CPC .................................................. H04L 63/1433
(Continued)

(56) References Cited

U.S. PATENT DOCUMENTS 8,286,239 B1 *  10/2012  Sutton ................. H04L 63/0227
                                                      726/22
2010/0138925 A1 *  6/2010  Barai .................. H04L 63/1433
                                                      726/25

(Continued)

FOREIGN PATENT DOCUMENTS

| CN | 1870493 A | 11/2006 |
| CN | 101101601 A | 1/2008 |
| CN | 103414718 A | 11/2013 |

OTHER PUBLICATIONS

Aime et al., "Enhanced Vulnerability Ontology for Information Risk Assessment and Dependability Management," 2010 Third International Conference on Dependability Year: 2010 pp. 92-97.*

(Continued)

*Primary Examiner* — Roderick Tolentino
(74) *Attorney, Agent, or Firm* — Baker & Hostetler LLP (57) ABSTRACT

The present invention discloses a method and an apparatus for detecting website security. The method includes: performing bypass interception on a network to snatch a hypertext transfer protocol request packet; acquiring a link corresponding to the hypertext transfer protocol request packet; inserting the link into a to-be-scanned queue as a priority task to be scanned if the link is determined to be new; and/or extracting a domain name corresponding to the link, inserting the domain name into the to-be-scanned queue as a priority task to be scanned if the domain name is determined to be new; and performing vulnerability scanning on the task to be scanned in the to-be-scanned queue.

14 Claims, 3 Drawing Sheets

---

Storage unit for storing a program code

431'

Program for executing steps of the method according to the disclosure (58) Field of Classification Search
USPC .................................................. 726/22–25
See application file for complete search history.

(56) References Cited

U.S. PATENT DOCUMENTS

| | | | |
|---|---|---|---|
| 2010/0319069 A1* | 12/2010 | Granstedt | H04L 63/0263 726/22 |
| 2011/0167474 A1* | 7/2011 | Sinha | G06F 21/51 726/1 |
| 2011/0302656 A1* | 12/2011 | El-Moussa | H04L 63/1425 726/24 |
| 2012/0084860 A1* | 4/2012 | Cao | H04L 63/1441 726/23 |
| 2012/0198558 A1* | 8/2012 | Liu | G06F 21/53 726/25 |
| 2012/0324582 A1* | 12/2012 | Park | G06F 21/577 726/25 |
| 2013/0097699 A1* | 4/2013 | Balupari | G06F 21/552 726/22 |
| 2015/0156210 A1* | 6/2015 | Hunt | H04L 63/1408 726/23 |

OTHER PUBLICATIONS

Whitty et al., "Defining the cyber domain for wireless communications security," 2011 IEEE 54th International Midwest Symposium on Circuits and Systems (MWSCAS) Year: 2011 pp. 1-4.*
International Patent Application No. PCT/CN2014/095944; Int'l Search Report; dated Apr. 1, 2015; 2 pages.

* cited by examiner

METHOD AND APPARATUS FOR DETECTING WEBSITE SECURITY

CROSS-REFERENCE TO RELATED APPLICATIONS

This application is the national stage of International Application No. PCT/CN2014/095944 filed Dec. 31, 2014, which claims the benefit of Chinese Patent Application No. CN 201410144318.7, filed Apr. 11, 2014, the entirety of which are incorporated herein by reference.

FIELD OF TECHNOLOGY

The present invention relates to the field of Internet, and in particular, to a method and apparatus for detecting website security

BACKGROUND

As Internet technologies are more and more widely used, a lot of routine work and entertainments are carried out online because networks are closely linked with our daily lives. Therefore, website security draws more and more attention. However, there are various potential safety hazards in networks, for example, COOKIE poisoning, application buffer overflow, cross-site scripting attack and known security vulnerability or the like, which make website users worry at any moment. The website users expect to know about degree of safety of websites and use safer websites, and webmasters expect to timely fix vulnerabilities and provide a safe browsing platform for website users.

In today's highly developed information, website services (codes) serving as information carriers are frequently updated, but information security professional allocated by each company are not many enough to support so many and frequent security tests.

For example, an island page is a page that cannot be snatched by a crawler, and thus huge risks may be caused once a vulnerability is discovered by a hacker. All existing vulnerability scanners perform security tests after snatching website links based on crawler technology, and thus neither can timely scan new online domain names nor can detect vulnerabilities on island pages.

SUMMARY

In the view of above problems, the present invention is proposed to provide a method for detecting website security, a corresponding apparatus for detecting website security, a corresponding computer program and a corresponding computer-readable medium to overcome the aforementioned problems or at least in part solve the aforementioned problems.

According to one aspect of the present invention, there is provided a method for detecting website security, which comprises:

performing bypass interception on a network to snatch a hypertext transfer protocol request packet;

acquiring a link corresponding to the hypertext transfer protocol request packet;

inserting the link into a to-be-scanned queue as a priority task to be scanned if the link is determined to be new; and/or extracting a domain name corresponding to the link, inserting the domain name into the to-be-scanned queue as a priority task to be scanned if the domain name is determined to be new; and performing vulnerability scanning on the task to be scanned in the to-be-scanned queue.

According to another aspect of the present invention, there is disclosed an apparatus for detecting website security, which comprises:

a snatching module, configured to snatch a hypertext transfer protocol request packet by performing bypass interception on a network;

an acquiring module, configured to acquire a link corresponding to the hypertext transfer protocol request packet;

a processing module, configured to determine the link to be new and/or extract a domain name corresponding to the link to determine the domain name to be new;

an inserting module, configured to insert the link and/or the domain name into a to-be-scanned queue as a priority task to be scanned; and a scanning module, configured to perform vulnerability scanning on the task to be scanned in the to-be-scanned queue.

According to still another aspect of the present invention, there is provided a computer program comprising a computer-readable code which causes an electronic device to perform the method for detecting website security above, when said computer-readable code is running on the electronic device.

According to yet another aspect of the present invention, there is provided a computer-readable medium storing the above-mentioned computer program.

According to a solution of the present invention, bypass interception is performed on a network, an http request packet is snatched, a link corresponding to the http request packet is acquired, the link is inserted into a to-be-scanned queue as a priority task to be scanned if the link is determined to be new; and/or a domain name corresponding to the link is extracted, the domain name is inserted into the to-be-scanned queue as a priority task to be scanned if the domain name is determined to be new, and vulnerability scanning is performed on the task to be scanned in the to-be-scanned queue. The link corresponding to a user request can be acquired by performing bypass interception on the network, and when the link or the domain name of the link is determined to be new, vulnerability scanning is preferentially performed on it, thus enabling to monitor a website security problem in real time and facilitating a discovery of a security vulnerability of the website.

Described above is merely an overview of a technical solution of the present invention. In order to more apparently understand the technical means of the present invention to implement in accordance with the contents of specification, and to more readily understand above and other objectives, features and advantages of the present invention, particular embodiments of the present invention are provided hereinafter.

BRIEF DESCRIPTION OF THE DRAWINGS

Through reading the detailed description of the following preferred embodiments, various other advantages and benefits will become apparent to those of ordinary skills in the art. Accompanying drawings are merely included for the purpose of illustrating the preferred embodiments and should not be considered as limiting of the present invention. Further, throughout the drawings, like reference signs are used to denote like elements. In the drawings.

DESCRIPTION OF THE EMBODIMENTS

The following will describe in more detail the exemplary embodiments of the present invention with reference to the accompanying drawings. Although the accompanying drawings display the exemplary embodiments of the present invention, it should be understood that the present invention may be implemented in various forms but not limited by the embodiments set forth herein. Instead, these embodiments are provided to more thoroughly understand the present invention, and completely convey the scope of the present invention to those skilled in the art.

Figure 1:
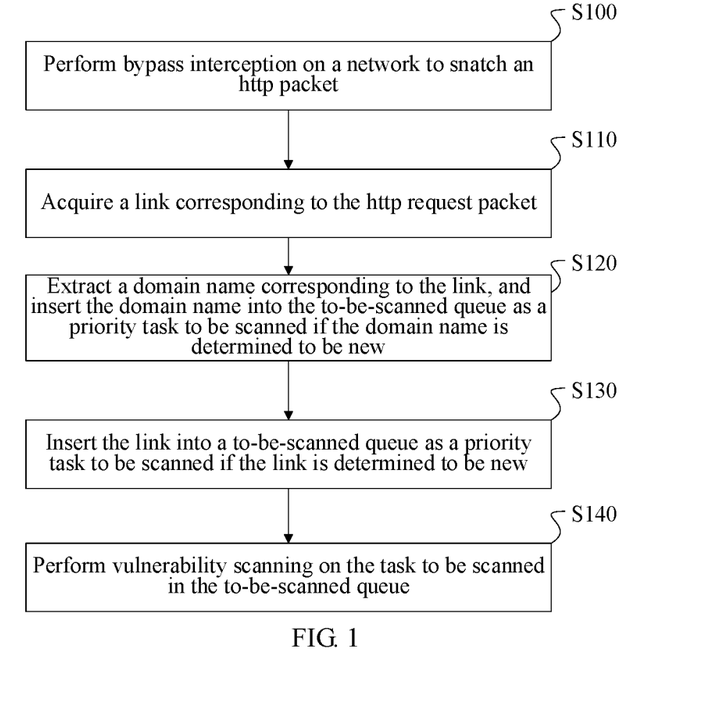
FIG. 1 is a flow chart of a method for detecting website security according to an embodiment of the present invention.

FIG. 1 is a flow chart of a method for detecting website security according to an embodiment of the present invention. As shown in FIG. 1, the method includes following steps.

Step S100: perform bypass interception on a network to snatch an http packet.

The http request packet may be a get request packet or a post request packet, etc. A get request is used for obtaining information of resource specified by requesting a uniform resource locator (URL) by way of an entity. If requesting a URL is merely a data generating process, finally resource pointed to a result of a processing procedure instead of a description of the processing procedure is returned in the response entity. A post request is used for sending a request to a destination server to ask the destination server to accept an entity attached after the request and take the entity as a new additional subitem of resource specified by a requested URL in a request queue. The get request packet or the post request packet includes a URL of a webpage.

Step S110: acquire a link corresponding to the http request packet.

Since the http request packet includes a URL of a webpage, a link corresponding to the http request packet can be acquired according to a corresponding URL, namely, the URL of the webpage.

Step S120: insert the link into a to-be-scanned queue as a priority task to be scanned if the link is determined to be new; and/or extract a domain name corresponding to the link, insert the domain name into the to-be-scanned queue as a priority task to be scanned if the domain name is determined to be new.

In this embodiment, a priority task to be scanned may be determined according to a link and a domain name, or the priority task to be scanned may be determined only according to a link or a domain name. Namely, a link is inserted into a to-be-scanned queue as a priority task to be scanned if the link is determined to be new, or a domain name corresponding to the link is extracted, the domain name is inserted into the to-be-scanned queue as a priority task to be scanned if the domain name is determined to be new.

Step S130: perform vulnerability scanning on the task to be scanned in the to-be-scanned queue.

According to the method provided by the present invention, bypass interception is performed on a network, an http request packet is snatched, a link corresponding to the http request packet is acquired, the link is inserted into a to-be-scanned queue as a priority task to be scanned if the link is determined to be new; and/or a domain name corresponding to the link is extracted, the domain name is inserted into the to-be-scanned queue as a priority task to be scanned if the domain name is determined to be new, and vulnerability scanning is performed on the task to be scanned in the to-be-scanned queue. The link corresponding to a user request can be acquired by performing bypass interception on the network, and when the link or the domain name of the link is determined to be new, vulnerability scanning is preferentially performed on it, thus enabling to monitor the website security problem in real time and facilitating the discovery of the security vulnerability of the website.

Figure 2:
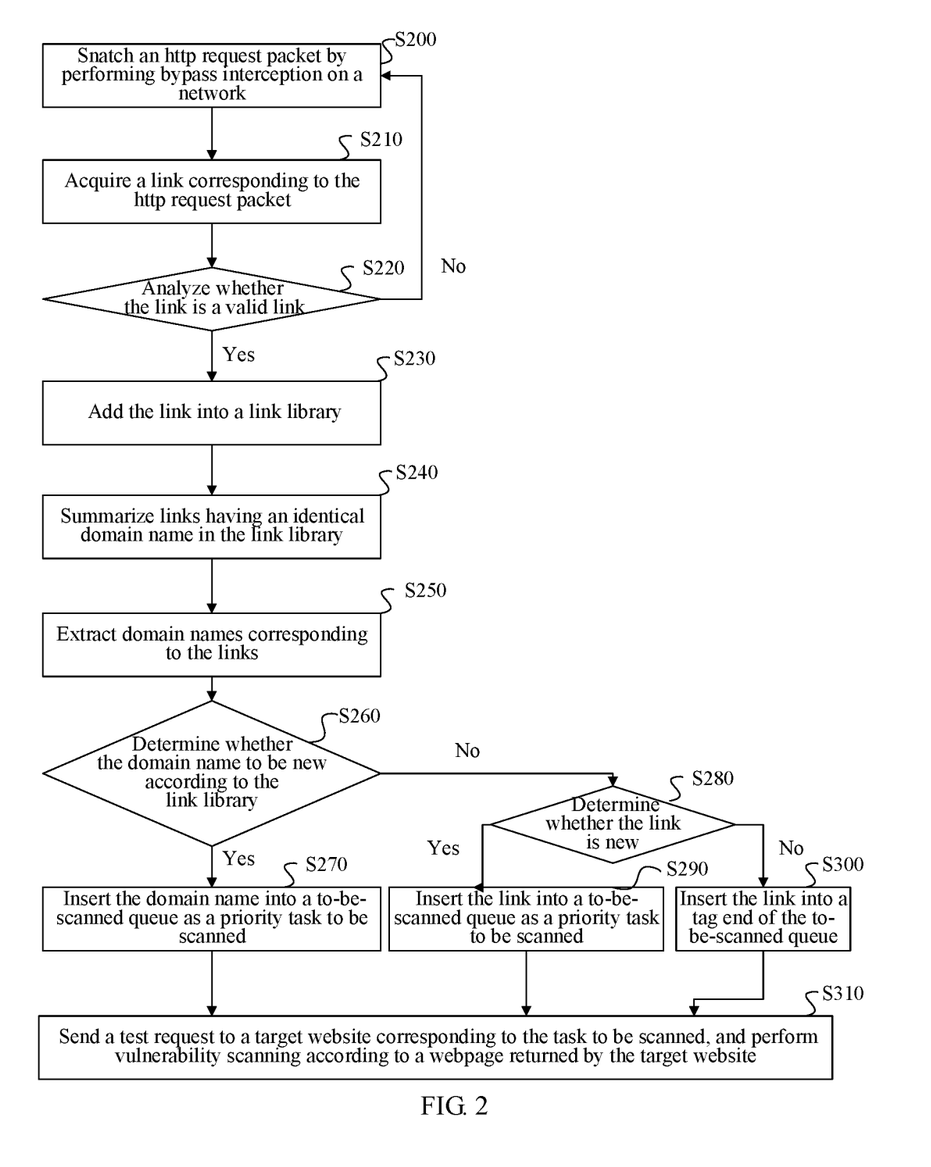
FIG. 2 is a flow chart of a method for detecting website security according to another embodiment of the present invention.

FIG. 2 is a flow chart of a method for detecting website security according to another embodiment of the present invention. As shown in FIG. 2, the method includes following steps.

Step S200: snatch an http request packet by performing bypass interception on a network.

The http request packet mainly includes: a protocol, a server domain name, a port number, a request packet path, a get parameter name, a post parameter name, an extension name and a target server network segment, etc. The http request packet may be a get request packet or a post request packet, etc. The get request packet or the post request packet includes a URL of a webpage.

A security detecting device is connected into a network by way of bypass interception to perform bypass interception on all network requests. A user may send an http request to a website when the user accesses the website through a client, and the security detecting device may snatch an http request packet according to the http request sent by the user.

Step S210: acquire a link corresponding to the hypertext transfer protocol request packet.

Since an http request packet includes the URL of a webpage, correspondingly, a corresponding link (namely, the URL of the webpage) may be restored and obtained from the http request packet.

Step S220: analyze whether the link is a valid link, and execute Step S230 if yes, otherwise execute Step S200.

The valid link refers to a link that can normally open a webpage or download a file. An invalid link refers to a link that is invalid and cannot provide the user with a webpage having valuable information. A link is determined to be an invalid link if the link has following phenomena: there is no domain name, the domain name is incomplete, the link is incomplete or there is no content in a post protocol data packet. Taking a certain link whose domain name is abcd.com as an example, the link is determined to be an invalid link if the link does not have the domain name abcd.com or only has a part of the domain name such as ad.com.

A link acquired in Step S210 is analyzed to determine whether the link is a valid link. The link is determined to be an invalid link if the link has following phenomena: there is no domain name, the domain name is incomplete, the link is incomplete or there is no content in a post protocol data packet; otherwise, the link is determined to be a valid link.

Step S230: Add the Link into a Link Library

The link library is configured to store all valid links to be visited by the user. Links determined to be valid links in S220 are added into the link library. To avoid repeatedly adding the same link into the link library, after the link is determined to be a valid link, it is first determined whether the link is present in the link library, and the link is added into the link library if the link is not present in the link library. In the present invention, if the link is not present in the link library, the link can be regarded as a new link, which can be used as a basis of determining whether the link is new subsequently.

Step S240: summarize links having an identical domain name in the link library.

For example, if a part of links in the link library have an identical domain name abcd.com, a part of links have an identical domain name cefg.com, and a part of links have an identical domain name fged.com, links in the link library are respectively summarized according to the domain names abcd.com, cefg.com and fged.com.

Step S250: extract domain names corresponding to the links.

Domain names corresponding to the links summarized in Step S240 are extracted, for example, domain names such as abcd.com, cefg.com and fged.com are obtained.

Step S260: determine whether the domain name to be new, and execute Step S270 if yes, otherwise execute Step S280.

Embodiments of the present invention provide two methods for determining whether a domain name is new, but determination methods are not limited to the methods enumerated as below.

Method 1: it is detected whether there is flow of the domain name within a preset time range, and it is determined the domain name to be new if no.

The flow refers to an access to a website. Taking a preset time range of one week as an example, it is detected whether there is flow of the domain name within this week, and the domain name is determined to be a new domain name if no.

For example, if no flow of the domain name fged.com is detected within one week, the domain name fged.com can be determined to be a new domain name.

Method 2: it is detected whether a validated domain name of a holder of the domain name is present in an IP address or an IP address range to which the domain name belongs, and it is determined the domain name to be the new domain name of the holder if yes.

For example, supposing a validated domain name such as webscan.xxx.cn/www.xxx.cn is present in an IP network segment 220.181.158.1-220.181.158.255 and the IP network segment has been determined (by means of a manual method or other methods) to belong to Company xxx, if a domain name newdomain.com newly appears in the IP 220.181.158.220, the domain name can be considered to be a new domain name of the company.

It is determined whether the domain name is a new domain name by using the foregoing two methods. In the above example, it is assumed that the detected fged.com is a new domain name, and the abcd.com and the cefg.com are already existing domain names.

Step S270: insert the domain name into a to-be-scanned queue as a priority task to be scanned.

After the domain name fged.com is determined to be a new domain name, the domain name fged.com is inserted into a to-be-scanned queue as a priority task to be scanned, tasks to be scanned may be sorted to be, for example, fged.com, abcd.com and cefg.com, wherein the new domain name fged.com is ranked at the forefront of the tasks to be scanned.

Step S280: determine whether the link is new, execute Step S290 if yes, otherwise execute Step S300.

When the domain name is determined not to be new, it is determined whether the link is new. A new link refers to a link having not appeared yet in the network when the domain name is present. For example, after it is determined that domain names abcd.com and cefg.com are already existing domain names, it is determined whether links having the foregoing domain names are new links, for example, it is determined whether a link http://www.abcd.com.*?* is a new link.

Step S290: insert the link into a to-be-scanned queue as a priority task to be scanned.

A link is inserted into a to-be-scanned queue as a priority task to be scanned if the link is determined to be a new link. For example, if a link http://www.abcd.com.*?* is determined to be a new link by using the foregoing method for determining a new link, the link is inserted into a to-be-scanned queue as a priority task to be scanned.

Step S300: insert the link into the tail end of the to-be-scanned queue.

Step S310: send a test request to a target website corresponding to the task to be scanned, and perform vulnerability scanning according to a webpage returned by the target website.

A test request is respectively sent to a target website corresponding to a task to be scanned according to the task to be scanned, after receiving the test request, the target website returns a webpage to the security detecting device to provide a vulnerability scanning service, and accesses a unique vulnerability library in Library Plan when providing the vulnerability scanning service to determine whether the task to be scanned is secure.

Website security detection data include at least one of: horse hanging data, false and fraud data, search mask data, margent data, falsified data and vulnerability data. A security detection is performed on a website according to website security detection data and a website security detection rule corresponding to the website security detection data, wherein the website security detection rule includes at least one of: a horse hanging rule, false and fraud rules, a mask rule, a margent rule, a falsified rule and a vulnerability rule. In the present invention, it is mainly used for scanning a webpage by using the vulnerability rule. The vulnerability rule is used for determining a vulnerability in a website according to vulnerability data.

Performing a security detection on a website according to vulnerability data and a vulnerability rule includes: acquiring a vulnerability characteristic prestored in a vulnerability characteristic database, determining whether the vulnerability data conform to the vulnerability characteristic, and determining the website has a vulnerability if the vulnerability data conform to the vulnerability characteristic; otherwise determining the website has no vulnerability. The vulnerability in the website is determined according to a determination result, wherein the vulnerability characteristic may be a vulnerability keyword. For example, a webpage status code 404 is taken as the vulnerability keyword; or a page content of the webpage status code 404 is taken as the vulnerability keyword; or by accessing a normal webpage of a website, extracting a page content, a webpage status code and an http header of the normal webpage, accessing an inexistent webpage of the website, extracting a page content, a webpage status code and an http header of a feedback webpage, and comparing the page content, the webpage status code and the http header of the normal webpage with those of the feedback webpage, a keyword of the webpage status code 404 is taken as the vulnerability keyword; or by accessing an inexistent webpage, the page content, the webpage status code and the http header of the feedback webpage are taken as vulnerability keywords or the like, which is not limited by the present invention.

The embodiment as shown in FIG. 2 provides steps of determining a priority task to be scanned according to a domain name and a link. As another two embodiments, a priority task to be scanned may also be determined only according to a link or a domain name.

To the embodiment in which a priority task to be scanned is determined only according to a link, the foregoing Step S240-S300 may be replaced with determining whether a link is a new link, and inserting the link into a to-be-scanned queue as the priority task to be scanned if yes; or inserting the link into the tail end of the to-be-scanned queue if no.

To the embodiment in which a priority task to be scanned is determined only according to a domain name, the foregoing Step S240-S300 may be replaced with summarizing links having the same domain name in the link library, extracting a domain name corresponding to the link, determining whether the domain name is a new domain name, inserting the domain name into the to-be-scanned queue as a priority task to be scanned if yes; or inserting the link into the tail end of the to-be-scanned queue if no.

According to the method of the present invention, bypass interception is performed on a network, an hypertext transfer protocol request packet is snatched, a link corresponding to the hypertext transfer protocol request packet is acquired, it is analyzed whether a link is a valid link, the link is added into a link library if the link is a valid link, links having an identical domain name in the link library are summarized, a domain name corresponding to the link is extracted, it is determined whether the domain name is a new domain name according to the link library, the domain name is inserted into a to-be-scanned queue as a priority task to be scanned if the domain name is determined to be a new domain name; or it is determined whether the link is a new link if the domain name is determined not to be a new domain name; the link is inserted into the to-be-scanned queue as a priority task to be scanned if the link is determined to be a new link; or the link is inserted into the tail end of the to-be-scanned queue if the link is determined not to be a new link; a test request is sent to a target website corresponding to the task to be scanned, and vulnerability scanning is performed according to a webpage returned by the target website. A link corresponding to a user request may be acquired by performing vulnerability scanning on a network, it is analyzed whether the link is a valid link, and links having an identical domain name in the link library are summarized. In this way, some invalid links can be removed, and a security detection is performed on the domain name. After the domain name is determined to be secure, it can be determined that links under the domain name are secure, thereby accelerating the security detection process. When the domain name is an existing domain name upon detection, it is determined whether a link is a new link, and a webpage that cannot be snatched by a web crawler can be detected. In this way, it is achievable to monitor a website security problem in real time, and it is advantageous to find a website security vulnerability.

Figure 3:
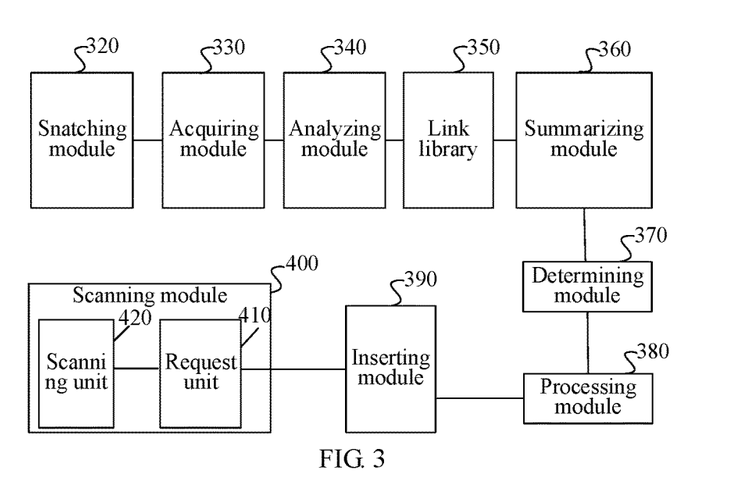
FIG. 3 is a structural block diagram of an apparatus for detecting website security according to an embodiment of the present invention.

FIG. 3 is a structural block diagram of an apparatus for detecting website security according to an embodiment of the present invention. As shown in FIG. 3, the apparatus includes: a snatching module 320, an acquiring module 330, an analyzing module 340, a link library 350, a summarizing module 360, a determining module 370, a processing module 380, an inserting module 390 and a scanning module 400.

The snatching module 320 is configured to snatch an http request packet by performing bypass interception on a network.

The http request packet mainly includes: a protocol, a server domain name, a port number, a request packet path, a get parameter name, a post parameter name, an extension name and a target server network segment, etc. The http request packet may be a get request packet or a post request packet, etc. The get request packet or the post request packet includes a URL of a webpage.

A security detecting device is connected into a network by way of bypass interception to perform bypass interception on all network requests. A user may send an http request to a website when the user accesses the website through a client, and the security detecting device may snatch an http request packet according to the http request sent by the user.

The acquiring module 330 is configured to acquire a link corresponding to the hypertext transfer protocol request packet.

Since an http request packet includes the URL of a webpage, correspondingly, a corresponding link (namely, the URL of the webpage) may be restored and obtained from the http request packet.

The analyzing module 340 is configured to analyze whether the link is a valid link.

The valid link refers to a link that can normally open a webpage or download a file. An invalid link refers to a link that is invalid and cannot provide the user with a webpage having valuable information. A link is determined to be an invalid link if the link has following phenomena: there is no domain name, the domain name is incomplete, the link is incomplete or there is no content in a post protocol data packet. Taking a certain link whose domain name is abcd.com as an example, the link is determined to be an invalid link if the link does not have the domain name abcd.com or only has a part of the domain name such as ad.com.

A link acquired by the acquiring module 330 is analyzed to determine whether the link is a valid link. The link is determined to be an invalid link if the link has following phenomena: there is no domain name, the domain name is incomplete, the link is incomplete or there is no content in a post protocol data packet; otherwise, the link is determined to be a valid link.

The link library 350 is configured to store links.

The link library 350 is configured to store all valid links to be visited by the user. Links determined to be valid links by the analyzing module 340 upon analysis are added into the link library. To avoid repeatedly adding the same link into the link library 350, after the link is determined to be a valid link, it is further determined whether the link is present in the link library, and the link is added into the link library 350 if the link is not present in the link library.

The summarizing module 360 is configured to summarize links having an identical domain name in the link library.

For example, if a part of links in the link library have an identical domain name abcd.com, a part of links have an identical domain name cefg.com, and a part of links have an identical domain name fged.com, links in the link library are respectively summarized according to the domain names abcd.com, cefg.com and fged.com.

The determining module 370 is configured to determine whether the link and/or the domain name are(is) new according to the link library.

When the domain name is determined not to be new, it is determined whether the link is new. A new link refers to a link having not appeared yet in the network when the domain name is present. For example, after it is determined that domain names abcd.com and cefg.com are already existing domain names, it is determined whether links having the foregoing domain names are new links, for example, it is determined whether a link http://www.abcd.com.\*\*\*?\*\*\* is a new link.

The processing module 380 is configured to determine the link to be new and/or extract a domain name corresponding to the link to determine the domain name to be new.

The processing module 380 is specifically configured to detect whether there is flow of the domain name within a preset time range, and determine the domain name to be new if no.

The flow refers to an access to a website. Taking a preset time range of one week as an example, it is detected whether there is flow of the domain name within this week, and the domain name is determined to be a new domain name if no.

For example, if no flow of the domain name fged.com is detected within one week, the domain name fged.com can be determined to be a new domain name.

The processing module 380 is specifically configured to detect whether a validated domain name of a holder of the domain name is present in an IP address or an IP address range to which the domain name belongs, and determine the domain name to be the new domain name of the holder if yes.

For example, supposing a validated domain name such as webscan.xxx.cn/www.xxx.cn is present in an IP network segment 220.181.158.1-220.181.158.255 and the IP network segment has been determined (by means of a manual method or other methods) to belong to Company xxx, if a domain name newdomain.com newly appears in the IP 220.181.158.220, the domain name can be considered to be a new domain name of the company.

It is determined whether the domain name is a new domain name by using the foregoing two methods. In the above example, it is assumed that the detected fged.com is a new domain name, and the abcd.com and the cefg.com are already existing domain names.

The inserting module 390 is configured to insert the link and/or the domain name into a to-be-scanned queue as a priority task to be scanned.

After the domain name fged.com is determined to be a new domain name, the domain name fged.com is inserted into a to-be-scanned queue as a priority task to be scanned, tasks to be scanned may be sorted to be, for example, fged.com, abcd.com and cefg.com, wherein the new domain name fged.com is ranked at the forefront of the tasks to be scanned.

When a link is determined to be a new link, the link is inserted into a to-be-scanned queue as a priority task to be scanned. For example, if a link http://www.abcd.com.\*\*\*?\*\*\* is determined to be a new link by using the foregoing method for determining a new link, the link is inserted into a to-be-scanned queue as a priority task to be scanned.

The scanning module 400 is configured to perform vulnerability scanning on the task to be scanned in the to-be-scanned queue.

The scanning module 400 includes:

a request unit 410, configured to send a test request to a target website corresponding to the task to be scanned; and a scanning unit 420, configured to perform vulnerability scanning according to a webpage returned by the target website.

A test request is respectively sent to a target website corresponding to a task to be scanned according to the task to be scanned, after receiving the test request, the target website returns a webpage to the security detecting device to provide a vulnerability scanning service, and accesses a unique vulnerability library in Library Plan when providing the vulnerability scanning service to determine whether the task to be scanned is secure.

Website security detection data include at least one of: horse hanging data, false and fraud data, search mask data, margent data, falsified data and vulnerability data. A security detection is performed on a website according to website security detection data and a website security detection rule corresponding to the website security detection data, wherein the website security detection rule includes at least one of: a horse hanging rule, false and fraud rules, a mask rule, a margent rule, a falsified rule and a vulnerability rule. In the present invention, it is mainly used for scanning a webpage by using the vulnerability rule. The vulnerability rule is used for determining a vulnerability in a website according to vulnerability data.

Performing a security detection on a website according to vulnerability data and a vulnerability rule includes: acquiring a vulnerability characteristic prestored in a vulnerability characteristic database, determining whether the vulnerability data conform to the vulnerability characteristic, and determining the website has a vulnerability if the vulnerability data conform to the vulnerability characteristic; otherwise determining the website has no vulnerability. The vulnerability in the website is determined according to a determination result, wherein the vulnerability characteristic may be a vulnerability keyword. For example, a webpage status code 404 is taken as the vulnerability keyword; or a page content of the webpage status code 404 is taken as the vulnerability keyword; or by accessing a normal webpage of a website, extracting a page content, a webpage status code and an http header of the normal webpage, accessing an inexistent webpage of the website, extracting a page content, a webpage status code and an http header of a feedback webpage, and comparing the page content, the webpage status code and the http header of the normal webpage with those of the feedback webpage, a keyword of the webpage status code 404 is taken as the vulnerability keyword; or by accessing an inexistent webpage, the page content, the webpage status code and the http header of the feedback webpage are taken as vulnerability keywords or the like, which is not limited by the present invention.

According to the apparatus of the present invention, bypass interception is performed on a network, an hypertext transfer protocol request packet is snatched, a link corresponding to the hypertext transfer protocol request packet is acquired, it is analyzed whether a link is a valid link, the link is added into a link library if the link is a valid link, links having an identical domain name in the link library are summarized, a domain name corresponding to the link is extracted, it is determined whether the domain name is a new domain name according to the link library, the domain name is inserted into a to-be-scanned queue as a priority task to be scanned if the domain name is determined to be a new domain name; or it is determined whether the link is a new link if the domain name is determined not to be a new domain name; the link is inserted into the to-be-scanned queue as a priority task to be scanned if the link is determined to be a new link; or the link is inserted into the tail end of the to-be-scanned queue if the link is determined not to be a new link; a test request is sent to a target website corresponding to the task to be scanned, and vulnerability scanning is performed according to a webpage returned by the target website. A link corresponding to a user request may be acquired by performing vulnerability scanning on a network, it is analyzed whether the link is a valid link, and links having an identical domain name in the link library are summarized. In this way, some invalid links can be removed, and a security detection is performed on the domain name. After the domain name is determined to be secure, it can be determined that links under the domain name are secure, thereby accelerating the security detection process. When the domain name is an existing domain name upon detection, it is determined whether a link is a new link, and a webpage that cannot be snatched by a web crawler can be detected. In this way, it is achievable to monitor a website security problem in real time, and it is advantageous to find a website security vulnerability.

The security detecting device supports intranet/extranet/IDC deployment, supports single machine and distributed deployment, and can be applied to large-scale enterprises. After being connected to an intranet by way of bypass interception, the device performs bypass interception on all network requests, performs a security detection on a link to be restored from a request, and rapidly detects the security of a new website and/or webpage if the website and/or webpage is on line. Furthermore, the device may also perform a security detection on an island page that cannot be snatched by a web crawler to more comprehensively monitor a website security problem.

Algorithm and display provided herein are not inherently related to a particular computer, virtual system or other equipment. Various general systems may also be used with the teaching based on the disclosure. According to the above description, the required structure for constructing such a system is obvious. In addition, the present invention is not directed to any particular programming language. It should be understood that a variety of programming languages can be used to implement the disclosed contents of the present invention as described herein and above description to the particular programming language is to disclose the best inventive implementation mode.

Many details are discussed in the specification provided herein. However, it should be understood that the embodiments of the disclosure can be implemented without these specific details. In some examples, the well-known methods, structures and technologies are not shown in detail so as to avoid an unclear understanding of the description.

Similarly, it should be understood that, in order to simplify the disclosure and to facilitate the understanding of one or more of various aspects thereof, in the above description of the exemplary embodiments of the disclosure, various features of the present invention may sometimes be grouped together into a single embodiment, accompanying figure or description thereof. However, the method of this disclosure should not be constructed as follows: the present invention for which the protection is sought specifies more features than those explicitly disclosed in each of claims. More specifically, as reflected in the following claims, the inventive aspect is in that the features therein are less than all features of a single embodiment as disclosed above. Therefore, claims following specific embodiments are definitely incorporated into the specific embodiments, wherein each of claims can be considered as a separate embodiment of the present invention.

It should be understood by those skilled in the art that modules of the device in the embodiments can be adaptively modified and arranged in one or more devices different from the embodiment. Modules, units or components in the embodiment can be combined into one module, unit or component, and also can be divided into more sub-modules, sub-units or sub-components. Except that at least some of features and/or processes or units are mutually exclusive, various combinations can be used to combine all the features disclosed in specification (including claims, abstract and accompanying figures) and all the processes or units of any methods or devices as disclosed herein. Unless otherwise definitely stated, each of features disclosed in specification (including claims, abstract and accompanying figures) may be taken place with an alternative feature having same, equivalent or similar purpose.

In addition, it should be understood by those skilled in the art, although some embodiments as discussed herein comprise some features included in other embodiment rather than other feature, combination of features in different embodiment means that the combination is within a scope of the present invention and forms the different embodiment. For example, in the claims, any one of the embodiments for which the protection is sought can be used in any combination manner.

Each of devices according to the embodiments of the present invention can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the modules in the device according to the embodiments of the present invention. The present invention may further be implemented as device program (for example, computer program and computer program product) for executing some or all of the methods as described herein. Such program for implementing the present invention may be stored in the computer readable medium, or have a form of one or more signals. Such a signal may be downloaded from the internet websites, or be provided in carrier, or be provided in other manners.

Figure 4:
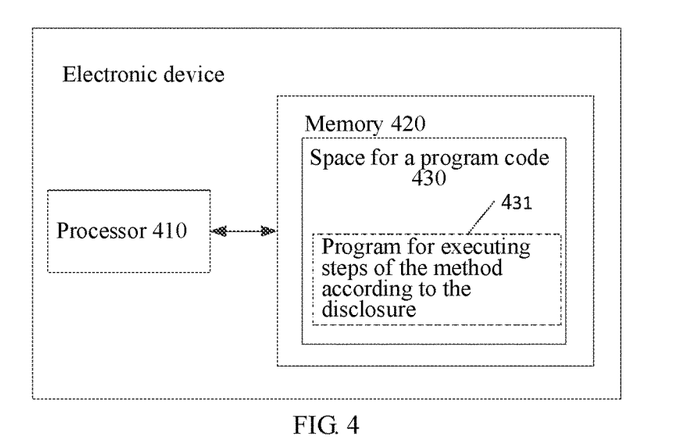
FIG. 4 is a block diagram of an electronic device for performing the method according to the present invention.
Figure 5:
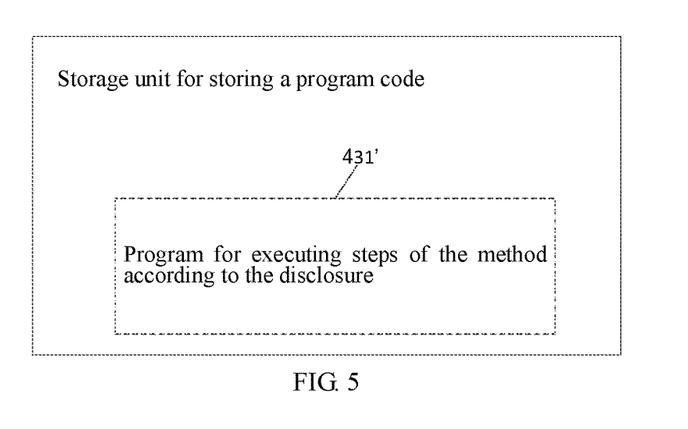
FIG. 5 is a schematic diagram of a storage unit for maintaining or carrying a program code for implementing the method according to the present invention.

For example, FIG. 4 is a block diagram of an electronic device for executing the method for detecting website security according to the present invention. Traditionally, the electronic device includes a processor 410 and a computer program product or a computer readable medium in form of a memory 420. The memory 420 could be electronic memories such as flash memory, EEPROM (Electrically Erasable Programmable Read-Only Memory), EPROM, hard disk or ROM. The memory 420 has a memory space 430 for program codes 431 executing any steps in the above methods. For example, the memory space 430 for program codes may include respective program codes 431 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in FIG. 5. The memory cells may be provided with memory sections, memory spaces, etc., similar to the memory 420 of the electronic device as shown in FIG. 4. The program codes may be compressed, for example, in an appropriate form. Usually, the memory cell includes computer readable codes 431' which can be read, for example, by processors 410. When these codes are operated on the electronic device, the electronic device may execute respective steps in the method as described above.

The "an embodiment", "embodiments" or "one or more embodiments" mentioned in the disclosure means that the specific features, structures or performances described in combination with the embodiment(s) would be included in at least one embodiment of the present invention. Moreover, it should be noted that, the wording "in an embodiment" herein may not necessarily refer to the same embodiment.

Many details are discussed in the specification provided herein. However, it should be understood that the embodiments of the disclosure can be implemented without these specific details. In some examples, the well-known methods, structures and technologies are not shown in detail so as to avoid an unclear understanding of the description.

It should be noted that the above-described embodiments are intended to illustrate but not to limit the present invention, and alternative embodiments can be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

Also, it should be noticed that the language used in the present specification is chosen for the purpose of readability and teaching, rather than explaining or defining the subject matter of the present invention. Therefore, it is obvious for an ordinary skilled person in the art that modifications and variations could be made without departing from the scope and spirit of the claims as appended. For the scope of the present invention, the publication of the inventive disclosure is illustrative rather than restrictive, and the scope of the present invention is defined by the appended claims.

What is claimed is:

1. A method for detecting website security, comprising:
    performing bypass interception on a network to snatch a hypertext transfer protocol request packet;
    acquiring a link corresponding to the hypertext transfer protocol request packet;
    extracting a domain name corresponding to the link;
    detecting a flow of the domain name within a predetermined period of time;
    determining that the domain name is new when there is no flow of the domain name within the predetermined period of time;
    inserting the domain name into a to-be-scanned queue as a priority task in response to a determination that the domain name is new;
    determining whether a link is new in response to a determination that the domain name is not new when there is the flow of the domain name;
    inserting the link into the to-be-scanned queue as the priority task in response to a determination that the link is new;
    performing vulnerability scanning on the priority task in the queue;
    adding the link into a link library; and
    determining whether the link or the domain name is new according to the link library.

2. The method according to claim 1, wherein the adding the link into a link library further comprises: summarizing links having an identical domain name in the link library.

3. The method according to claim 1, further comprising: determining the domain name to be a new domain name of a holder of the domain name if a validated domain name of the holder is present in an IP address or an IP address range to which the domain name belongs upon detection.

4. The method according to claim 1, wherein before the adding the link into a link library, the method further comprises: analyzing whether the link is a valid link.

5. The method according to claim 1, wherein the performing vulnerability scanning on the priority task in the to-be-scanned queue specifically comprises:
    sending a test request to a target website corresponding to the priority task, and performing vulnerability scanning according to a webpage returned by the target website.

6. An electronic device for detecting website security, comprising:
    a memory having instructions stored thereon;
    a processor configured to execute the instructions to perform operations for detecting website security, the operations comprising:
    snatching a hypertext transfer protocol request packet by performing bypass interception on a network;
    acquiring a link corresponding to the hypertext transfer protocol request packet;
    extracting a domain name corresponding to the link;
    detecting a flow of the domain name within a predetermined period of time;
    determining that the domain name is new when there is no flow of the domain name within the predetermined period of time;
    inserting the domain name into a to-be-scanned queue as a priority task in response to a determination that the domain name is new when there is no flow of the domain name;
    determining whether a link is new in response to a determination that the domain name is not new when there is the flow of the domain name;
    inserting the link into the to-be-scanned queue as the priority task in response to a determination that, the link is new; and
    performing vulnerability scanning on the priority task in the to-be-scanned queue;
    adding the link into a link library; and
    determining whether the link or the domain name is new according to the link library.

7. The electronic device according to claim 6, wherein the operations further comprise: summarizing links having an identical domain name in the link library.

8. The electronic device according to claim 6, wherein the operations further comprises:
    detecting whether a validated domain name of a holder of the domain name is present in an IP address or an IP address range to which the domain name belongs, and determining the domain name to be the new domain name of the holder if yes.

9. The electronic device according to claim 6, wherein the operations further comprise:
    analyzing whether the link is a valid link.

10. The electronic device according to claim 6, wherein the operation of performing vulnerability scanning on the priority task in the to-be-scanned queue further comprises:
    sending a test request to a target website corresponding to the priority task; and
    performing vulnerability scanning according to a webpage returned by the target website.

11. A non-transitory computer-readable medium having computer programs stored thereon that, when executed by one or more processors of an electronic device, cause the electronic device to perform operations for detecting website security, the operations comprising:

performing bypass interception on a network to snatch a hypertext transfer protocol request packet;

acquiring a link corresponding to the hypertext transfer protocol request packet;

extracting a domain name corresponding to the link;

detecting a flow of the domain name within a predetermined period of time;

determining that the domain name is new when there is no flow of the domain name within the predetermined period of time;

inserting the domain name into a to-be-scanned queue as a priority task in response to a determination that the domain name is new;

determining whether a link is new in response to a determination that the domain name is not new when there is the flow of the domain name;

inserting the link into the to-be-scanned queue as the priority task in response to a determination that the link is new;

performing vulnerability scanning on the priority task in the queue;

adding the link into a link library; and determining whether the link or the domain name is new according to the link library.

12. The non-transitory computer-readable medium according to claim 11, wherein operation of the adding the link into a link library further comprises: summarizing links having an identical domain name in the link library.

13. The non-transitory computer-readable medium according to claim 11, wherein the operations further comprises:

determining the domain name to be a new domain name of a holder of the domain name if a validated domain name of the holder is present in an IP address or an IP address range to which the domain name belongs upon detection.

14. The non-transitory computer-readable medium according to claim 11, wherein before the operation of adding the link into a link library, the electronic device is further caused to perform the operation of: analyzing whether the link is a valid link.

\* \* \* \* \*